United States Patent [19]

Ayer

[11] Patent Number: 4,918,258

[45] Date of Patent: Apr. 17, 1990

[54] MODULAR ELECTRICAL WIRING SYSTEM

[76] Inventor: David L. Ayer, P.O. Box 42, No. Franklin, Conn. 06254

[21] Appl. No.: 275,100

[22] Filed: Nov. 22, 1988

[51] Int. Cl.[4] .............................................. H02G 3/08
[52] U.S. Cl. ........................................ 174/53; 439/535
[58] Field of Search ........................... 174/53; 220/3.2; 439/535; 200/297

[56] References Cited

U.S. PATENT DOCUMENTS

| | | | |
|---|---|---|---|
| 1,081,378 | 12/1913 | Freeman | 248/223.4 |
| 2,397,688 | 4/1946 | Osinski | 174/53 |
| 2,401,948 | 6/1946 | Loy | 174/53 |
| 2,433,917 | 1/1948 | McCartney | 174/53 |
| 2,531,350 | 11/1950 | Chrastina | 200/51 R |
| 2,828,394 | 3/1958 | Mayzik | 200/297 |
| 2,908,743 | 10/1959 | Premoshis | 174/53 |
| 3,038,141 | 6/1962 | Chiuchiolo | 439/650 |
| 3,157,732 | 11/1964 | Richards | 174/53 |
| 3,221,216 | 11/1965 | Kobryner | 361/386 |
| 3,365,156 | 1/1968 | Beck | 248/205.1 |
| 3,610,561 | 10/1971 | Greenwood | 248/205.1 |
| 3,848,224 | 11/1974 | Olivero | 439/721 |
| 3,915,189 | 10/1975 | Holbrook et al. | 137/205 |
| 3,922,478 | 11/1975 | Perkey | 174/53 |
| 4,008,872 | 2/1977 | Thompson | 248/224.2 |
| 4,062,470 | 12/1977 | Boteler | 220/3.3 |
| 4,117,258 | 9/1978 | Shanker | 174/53 |
| 4,165,443 | 8/1979 | Figart et al. | 174/53 |
| 4,210,772 | 7/1980 | Magana et al. | 174/59 |
| 4,295,018 | 10/1981 | Borrelli | 200/51.09 |

FOREIGN PATENT DOCUMENTS

| | | |
|---|---|---|
| 1139998 | 11/1962 | Fed. Rep. of Germany . |
| 2711324 | 9/1978 | Fed. Rep. of Germany . |
| 1098984 | 8/1955 | France . |
| 258987 | 4/1964 | Netherlands . |

*Primary Examiner*—Leo P. Picard
*Assistant Examiner*—David A. Tone
*Attorney, Agent, or Firm*—Benasutti

[57] ABSTRACT

A system utilizing modular hardware for residential and commercial buildings. The system includes pre-wired molded plastic hardware and a circuit breaker panel which can be attached to electrical circuits having wire modules, and can be expanded using a circuit breaker panel extension module. It further includes smaller electrical boxes having mounting dovetails including electrical contacts for electrically and supportedly connecting a first electrical box to a second and third. A cavity is centrally disposed in each electrical box for receiving a pre-wired modular function unit and a standard function module, or a single pre-wired standard function module unit. The standard function module can be a standard switch, dual receptacle, lighting fixture, circuit breaker, or junction box and the like.

17 Claims, 6 Drawing Sheets

MODULAR ELECTRICAL WIRING SYSTEM

FIELD OF THE INVENTION

This invention relates to hardware for wiring commercial and residential buildings and more particularly to modular hardware for such wiring.

BACKGROUND OF THE INVENTION

Conventional wiring system usually include a large circuit breaker panel which feeds each circuit in the structure through a separate circuit breaker. This panel is usually nothing more than a large metal box containing two main buss bars and a main breaker matched to the maximum anticipated load for which the system is designed. This box must then be wired manually, routing wires from the multiple circuits into the box and then routing the separate wires from the circuits to there respective circuit breaker, neutral buss bar and ground buss bar. This is a very time consumming job and it can be very dangerous to change anything once the system has been wired and power applied. It results in a very tightly packed bundle of wires which is very difficult and dangerous to modify at a later date.

Conventional wiring systems include smaller electrical boxes, which are usually nailed to studs. Switches and/or receptacles may be mounted in these electrical boxes and junctions between electrical circuits may be located within them. To attach an electrical wire to a switch receptacle or point connection inside an electrical box, an electrical wire is run through an opening in the box to the point of connection. The end of the wire is then stripped and inserted into were gripper holes or looped around the screw and secured by tightening the screw to the switch or receptacle or other point of connection. The switch or receptacle is then forced into the box and retained by means of retaining screws. When it is desired to form a junction between electrical wires, typically the wires are inserted into the box openings in the sides, pulled out the front, stripped, twisted together, and secured together by means of wire nuts. They are then forced back into the box and a cover is secured.

U.S. Pat. No. 4,165,443 shows a modular electrical wiring system with the ability to supportively connect a series of electrical boxes to each other. However, this hardware requires separate input and output lines for each electrical box, and must be prewired by hand by the installer before the switch or receptacle module is inserted, thus affording no time saving benefit or simplifying the installation.

Although this type of hardware has been in use for many years, it is difficult for people of limited experience to understand and use and install it correctly and safely. It is time consumming for even experienced professionals. It is furthermore, very difficult and dangerous to add to or modify once in place. Therefore, a need exists for a wiring system which is easily understood, including by so-called "do it yourselfers" having limited knowledge of residential and commercial wiring.

It is therefore an object of the present invention to provide hardware for use in wiring residential and commercial buildings which is easy to use.

It is another object of the present invention to provide modular hardware for use in wiring residential and commercial buildings.

It is a further object of the present invention to provide hardware for use in wiring residential and commercial buildings, in which the electrical wiring and the hardware may be quickly and easily connected.

It is yet another object of the present invention to provide hardware for wiring residential and commercial buildings wherein junctions between electrical circuits can be made without splicing or wire nuts.

It is still a further object of the present invention to provide modular hardware for wiring residential and commercial buildings which provides for versitility and easy expandability after it has been installed and power applied.

It is a still further object of the present invention to provide modular hardware for wiring residential and commercial buildings which is prewired to accept modular function units such as switches, receptacles, junctions, lighting fixtures, circuit breakers, and the like.

It is a final object of the present invention to provide a circuit breaker panel which is prewired to accept conventional circuit breakers, and which could be safely and easily modified or expanded after the system has been installed and power applied.

SUMMARY OF THE INVENTION

Modular hardware for wiring residential and commercial buildings includes brackets, electrical boxes and electrical modules. A mounting bracket, adapted to receive an electrical box, is attached to a portion of the building to be wired, for example a wall stud or ceiling joist. The electrical box is pre-wired and receives pre-wired modular function units which mate with standard switches or outlets. The function units may also be circuit breakers to adapt the electrical box to be a circuit breaker panel. The boxes mate with each other and apply electrical energy to each other.

BRIEF DESCRIPTION OF THE DRAWINGS

FIG. 11 is an example of an electrical circuit including the modular hardware of the present invention.

DESCRIPTION OF THE PREFERRED EMBODIMENT

Figure 1:
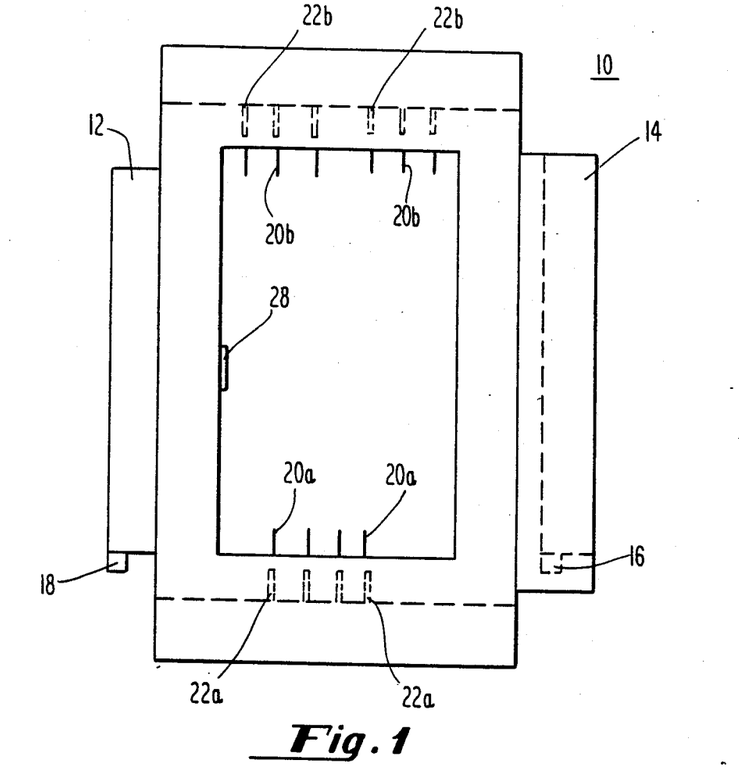
FIG. 1 illustrates the electrical box of the present invention.
Figure 2:
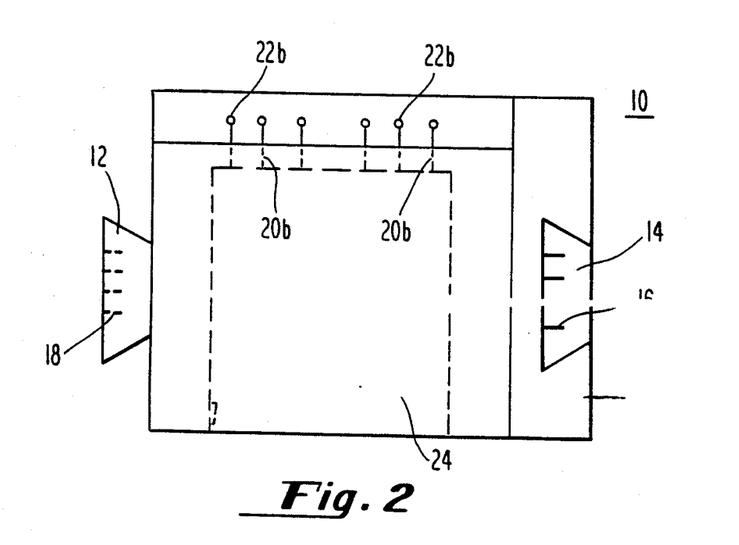
FIG. 2 is a top view of the electrical box of FIG. 1.
Figure 2:
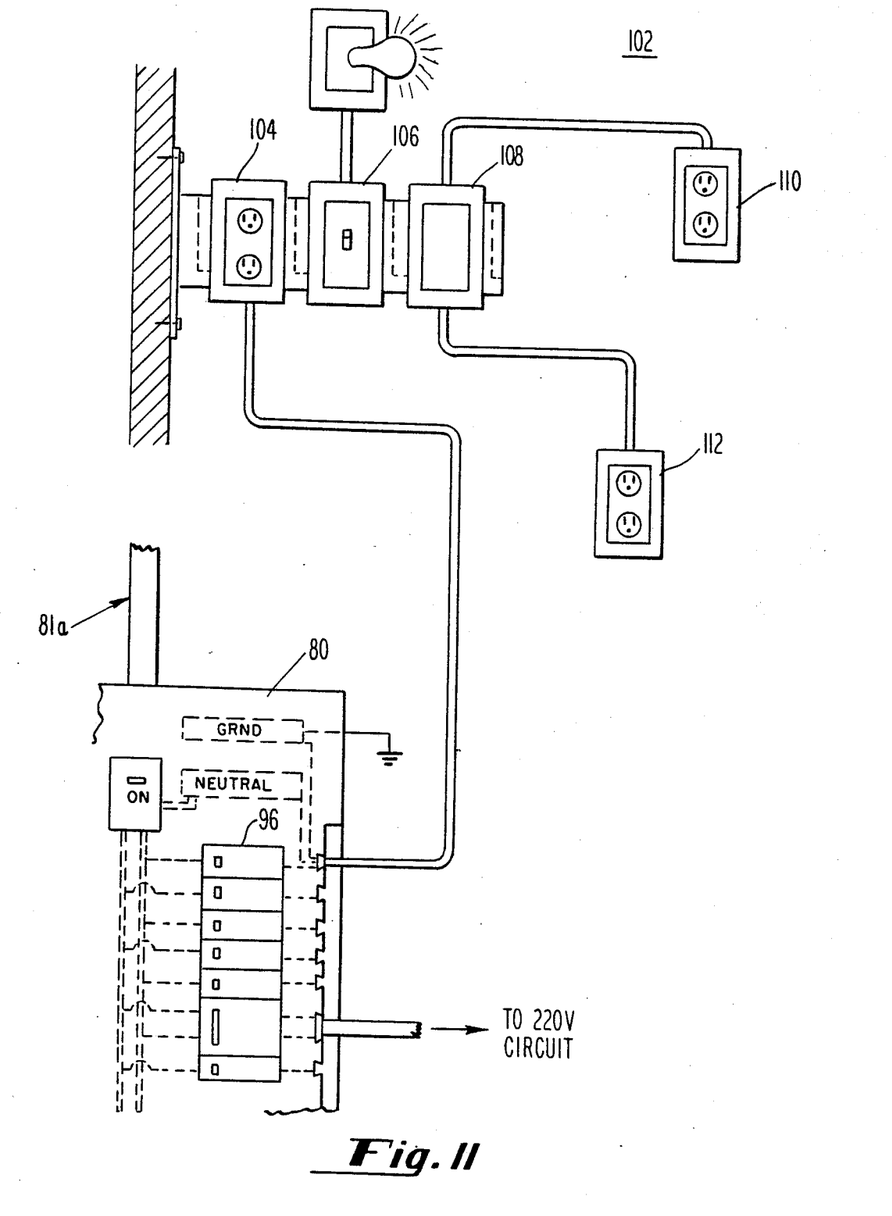
Figure 3:
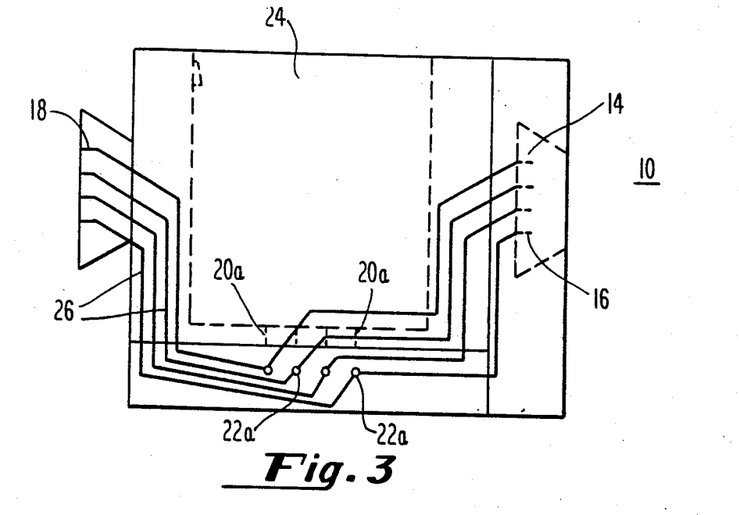
FIG. 3 is a bottom view of the electrical box of FIG. 1, illustrating the internal wiring connections of the electrical box.

Referring now to FIGS. 1,2,3, there is shown electrical box 10 of the present invention. Electrical box 10 includes male dovetail 12 extending from on side thereof and female dovetail mounting groove 14 on the opposite side. Male dovetail 12 of an electrical box 10 slidingly mates with female dovetail mounting groove 14 of another electrical box 10 (not shown). Thus a plurality of electrical boxes 10 may be mounted adjacent to each other and mating with each other.

Male dovetail 12 is provided with a plurality of male electrical contacts 18 depending downwardly therefrom. Female dovetail mounting groove 14 is provided with a plurality of female electrical contacts 16 which are adapted to matably receive male electrical contacts 18 extending downwardly from a male dovetail of an adjacent mating electrical box 10. Male electrical contacts 18 and respective female electrical contacts 16 within each electrical box 10 are further electrically coupled to each other by way of electrical connections 26 to provide electrical continuity between adjacent mated electrical boxes 10 (not shown) mounted on either side of a central electrical box 10. If electrical continuity between boxes 10 is not required male contacts 18 may be broken off along a break line (not shown) to prevent contact with female contacts 16 of another box 10.

Figure 4:
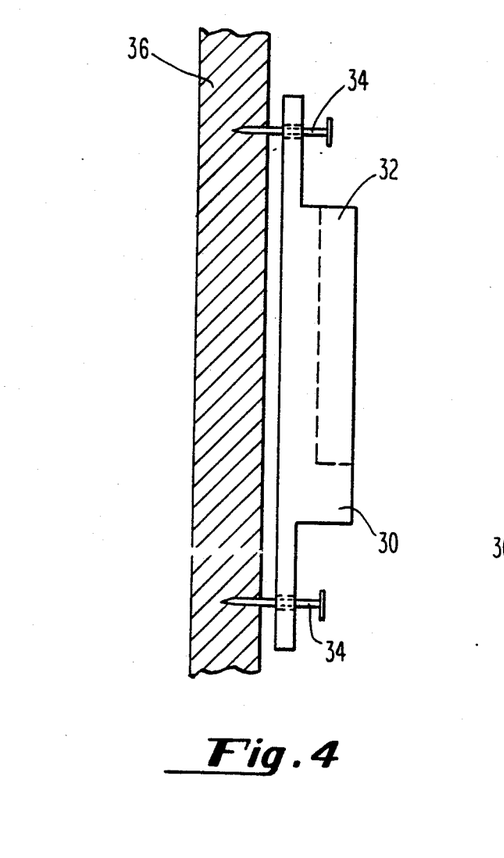
FIG. 4 illustrates a mounting bracket for mounting the electrical box of FIG. 1.
Figure 5:
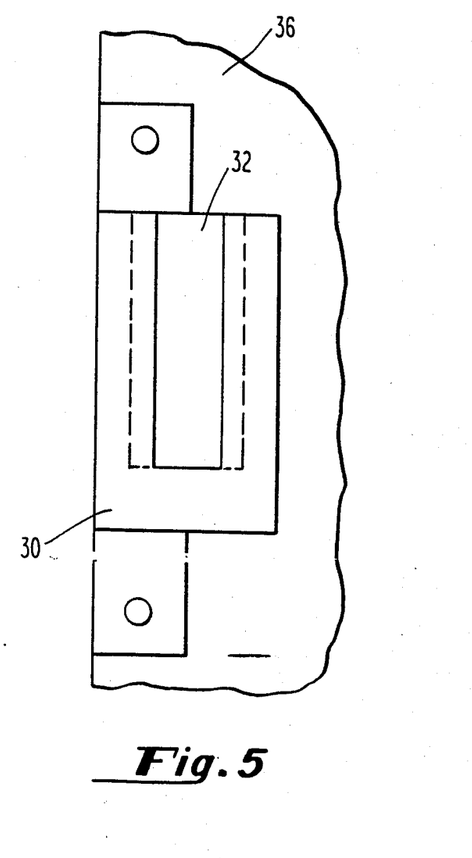
FIG. 5 is a side view of the mounting bracket FIG. 4.
Figure 6:
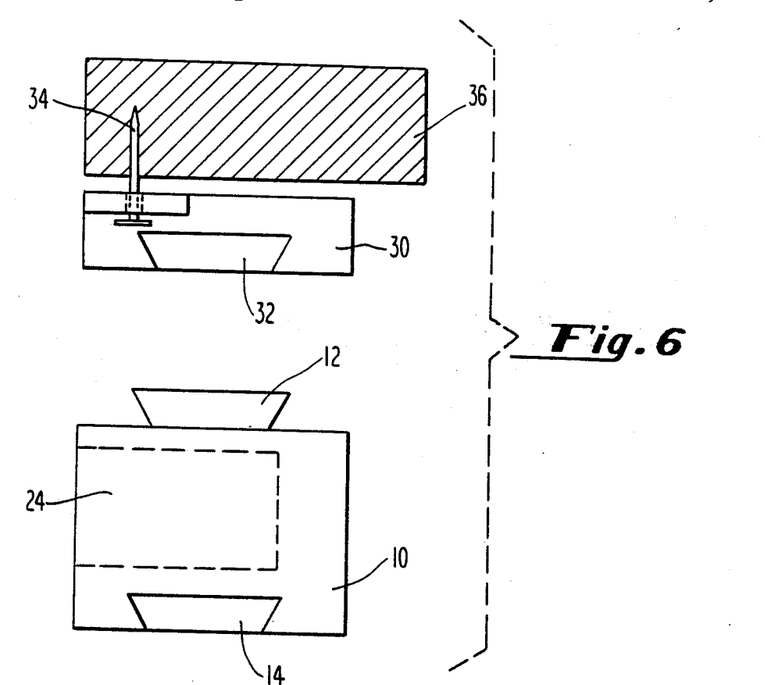
FIG. 6 is a top view of mounting bracket of FIG. 4 and a portion of electrical box of FIG. 1.

Referring now to FIGS. 4, 5, 6, mounting bracket 30 is shown. Mounting bracket 30 is secured to wall stud or ceiling joist 36 by nails 34. Mounting bracket 30 includes female dovetail mounting groove 32 for receiving a male dovetail 12 which protrudes from the side of mating electrical box 10 as previously described. When mounting bracket 30 is secured to stud or joist 36, electrical box 10 is attached to mounting bracket 30 by sliding male dovetail 12 of electrical box 10 into female dovetail mounting groove 32 of mounting bracket 30. Thus male dovetail 12 may mate either with mounting bracket 30 or with female dovetail 14 of another box 10.

Electrical box 10 contains centrally disposed opening 24 or module cavity 24, into which pre-wired modular function units may be inserted. A plurality of female electrical contacts 20a, b are disposed at the rear of electrical module cavity 24, preferably at the top and bottom thereof. For ease of description, hereinafter any electrical element having a reference numeral with the suffix "a" shall be understood to be a feed element, while a reference numeral with a suffix "b" shall denote an output element.

A plurality of female electrical contacts 20a,b are electrically coupled to a plurality of wire gripper holes 22a,b, respectively, which are disposed in the back of electrical box 10, preferably at the top and bottom thereof. In the preferred embodiment, box 10 is provided with four electrical contacts 20a and six electrical contacts 20b. In addition to being electrically coupled to female electrical contacts 20a, b wire gripper holes 22a may also be electrically connected to male electrical contacts 18 and female electrical contacts 16 on male and female dovetails 12,14, respectively.

Figure 7A:
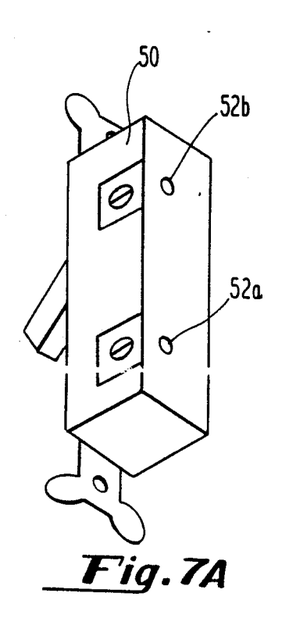
FIGS. 7A,B illustrate a standard electrical switch and a pre-wired modular function unit.
Figure 7B:
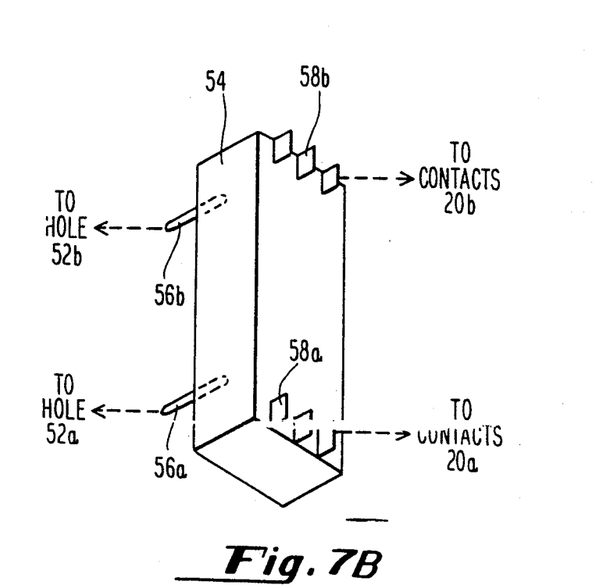
Figure 8:
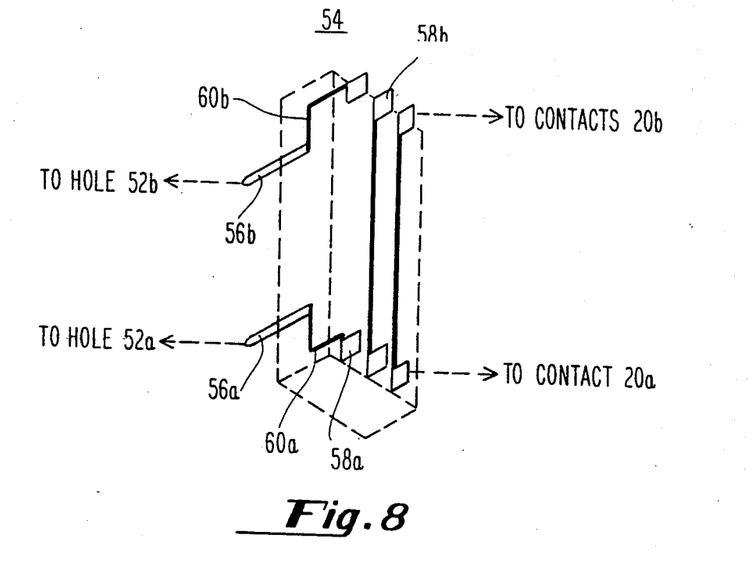
FIG. 8. Illustrates a wiring diagram for the pre-wired modular function unit of FIG. 7B.

Referring now to FIGS. 7A, 7B and FIG. 8, there is shown standard function module 50 and pre-wired modular function unit 54 which is adapted to mechanically and electrically mate with standard function module 50. Also illustrated is the internal wiring of modular function unit 54 which connects male electrical contacts 58a,b, and wire pins 56a,b of pre-wired modular function unit 54.

Standard function module 50 may be a standard single pole single throw switch. Pre-wired modular function unit 54 includes wire pin 56a and wire pin 56b each extending from a front mating surface thereof. Pins 56a,b are located and adapted to be grippingly received by wire gripper hole 52a and wire gripper hole 52b respectively located in a mating rear surface of standard function module or standard switch 50. Within modular function unit 54 wire pins 56a,b, are conductively coupled to male electrical contacts 58a,b by contact leads 60a,b, respectively. Male electrical contacts 58a,b, extend from the rear surface of pre-wired modular function unit 54 and are positioned to respectively mate with female contacts 20a,b, disposed on the back surface of electrical module cavity 24 of electrical box 10.

Figure 9A:
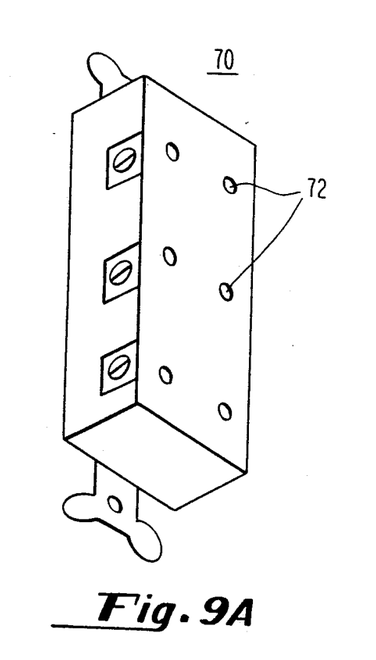
FIGS. 9A,B illustrate a standard dual electrical outlet and an alternate embodiment of a pre-wired modular function unit.
Figure 9B:
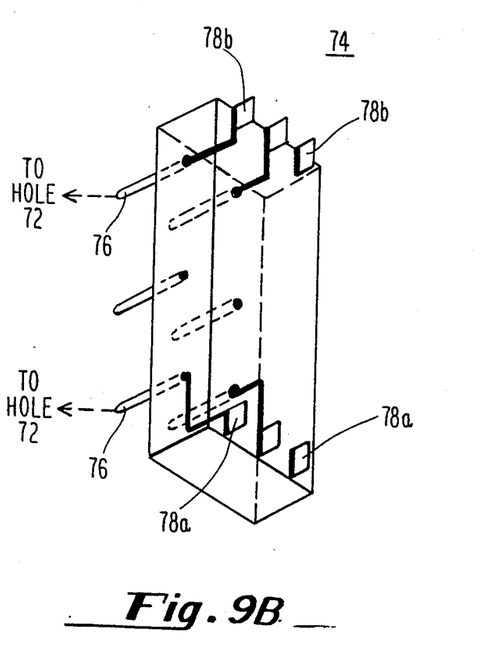

Referring now to FIGS. 9A,B there is shown standard function module 70 and pre-wired electrical modular function unit 74. Standard function module 70 may be a standard dual outlet 70. Pre-wired electrical modular function unit 74 is provided with six wire pins 76 extending from a front mating surface thereof. Wire pins 76 are adapted to be matingly received in six wire gripper holes 72 in a rear mating surface of standard dual outlet 70. Each wire pin 76 is electrically connected to a respective male electrical contact 78a,b, extending from the rear surface of modular function unit 74. Male connectors 78a,b are adapted to respectively engage female electrical connectors 20a,b disposed on the rear surface of electrical module cavity 24 of electrical box 10.

Rather than using an existing switch 50 in combination with unit 54, it will be understood by those skilled in the art that a single integral unit (not shown) may be provided including both a switch and contacts 58a,b for plugging this single integral unit into box 10 without any prior mating operations. Such a single integral unit is the most preferred embodiment of the present invention. Similarly, a single integral unit may be provided wherein the functions of outlet 70 are already combined with contacts 78a,b and may be plugged directly into box 10. Likewise, such a single unit is the preferred embodiment of the present invention.

After determining a location for a dual receptacle 70 or a standard switch 50, a mounting bracket 30 is nailed to a stud 36 or ceiling joist 36 adjacent that location. Electrical box 10 is then mounted on mounting bracket 30 by inserting male dovetail 18 of electrical box 10 into female dovetail mounting groove 32 of bracket 30. The ends of the wires (not shown) to be connected to receptacle 70 or switch 50 are then stripped and inserted into gripper holes 22a disposed in the bottom of electrical box 10. For single phase, one hundred ten volt AC wiring, there are typically three wires which are colored coded in accordance with their function; that is, the hot wire is black, the neutral wire is white and the ground wire is green. For two hundred twenty volt systems, a fourth hot red wire is included For ease of installation, each gripper hole 22a,b may be color coded to receive a particular color coded wire. As indicated above, feed gripper holes 22a disposed in the bottom of electrical box 10, are electrically connected to electrical contacts 18,16 of respective male dovetails 12 and female dovetails 14 which supply electrical power to mating electrical boxes 10. For example, if a wiring plan calls for a switched circuit, a switch type pre-wired modular function unit 54 is inserted in electrical module cavity 24 of electrical box 10 until male electrical contacts 58a,b on the back surface of modular function unit 54 respectively engage the receiving female electrical contacts 20a,b disposed in the back surface of electrical module cavity 24. Nub 28 retains the pre-wired modular function unit 54 in place.

Electrical wires (not shown) are stripped and inserted into output wire grippers 22b which are disposed in the top of the electrical box 10. These electrical wires are used to electrically connect electrical box 10 to electrical loads, other hardware and other circuits in accordance with the wiring plan. A switch 50 is then mated with the pre-wired modular function unit 54 by inserting wire pins 56a,b extending from the front surface of pre-wired modular function unit 54 into respective wire gripper holes 52a,b of switch 50. Since both electrical box 10 and pre-wired modular function unit 54 have been pre-wired to make electrical contact with the wiring installed in feed gripper holes 22a and output gripper holes 22b of box 10, switch 50 automatically makes proper electrical connection with the electrical circuit. Similarly, installing a standard outlet 70 onto an outlet pre-wired modular function unit 74 which has been installed in electrical box 10, automatically makes the proper electrical contact with the wiring system.

It should be understood that the standard function module is not limited to standard switches 50 or dual outlets 70, but may also include, for example, junction box modules, lighting modules, fan modules, two-way, three-way and four-way switches. Additionally, a circuit breaker can be constructed in a similar manner with internally pre-wired snap-in modules and snap-in breakers.

Figure 10:
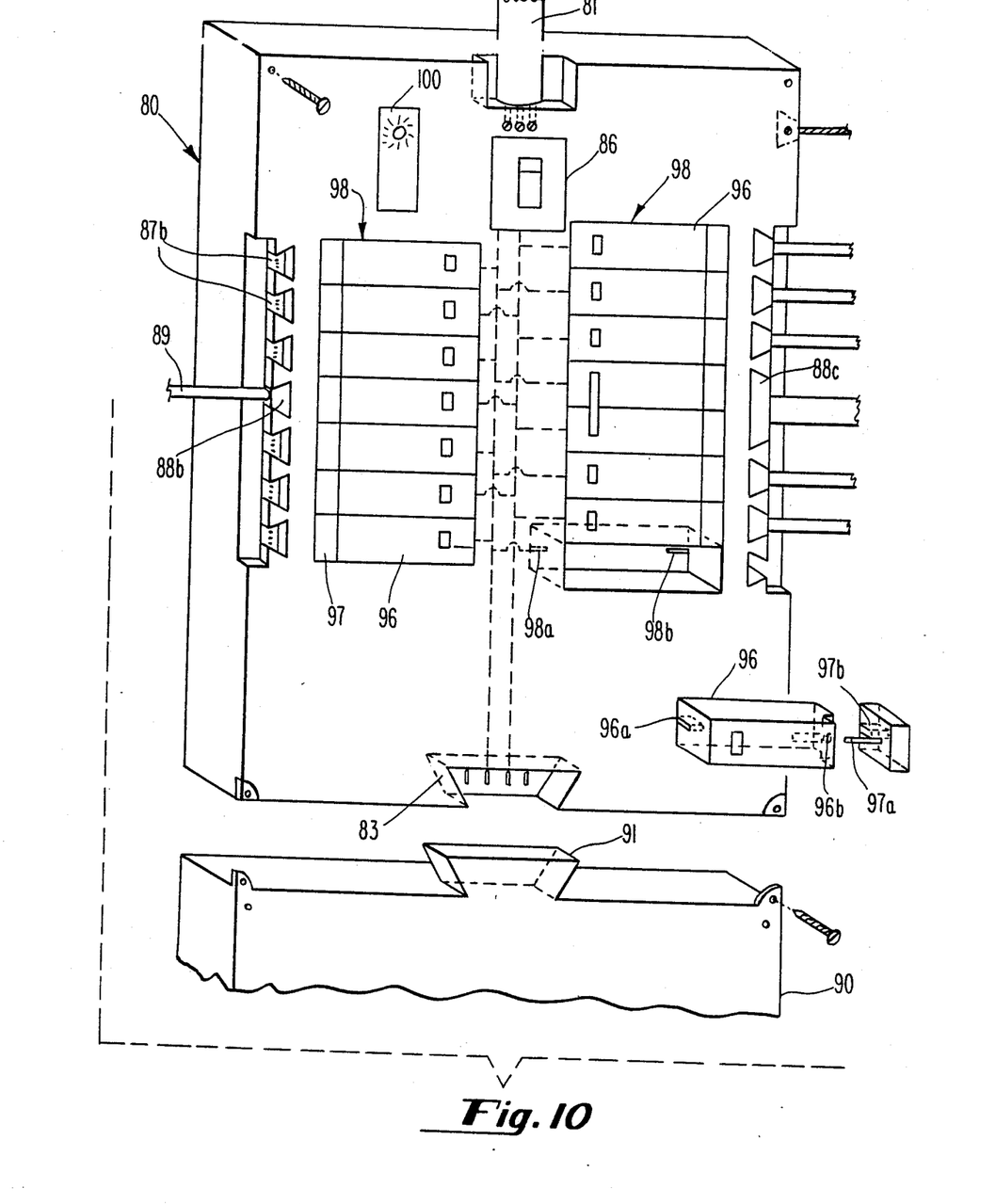
FIG. 10 illustrates the circuit breaker panel of the present invention, the circuit breaker panel extension module and the wire module.

Referring now to FIG. 10 modular circuit breaker panel 80 is shown. All electrical wiring connections required for circuit breaker panel 80 are contained therein and breaker panel 80 is formed of heat resistant plastic into an integral unit.

Multiple female circuit breaker receptacles 98 are centrally located on both sides of panel 80. Main buss bars within panel 80 are connected to male electrical contacts 98a within circuit breaker receptacle 98.

Male electrical contact 98b, also within each circuit breaker receptacle 98, is electrically connected to the female power transfer contact in female circuit feed receptacle 87b.

A standard circuit breaker 96 is fitted with circuit breaker module 97 by sliding metal conductor pin 97a on circuit breaker module 97 matingly into circuit breaker 96 and tightening screw 96b to secure the two as one unit. Pin 97a is electrically connected to slotted female electrical contact 97b on the bottom of circuit breaker module 97.

To power a circuit the unified circuit breaker 96 and circuit breaker module 97 are inserted in circuit breaker receptacle 98 where male electrical contacts 98a, 98b matingly engage female electrical contacts 96a, 97b respectively.

To accomplish wiring of the panel 80 service feed cable 81a is stipped and inserted into the top of panel 80 and the black, red, and white wires are secured to the respective color coded terminals of panel 80 with set screws (not shown). Main circuit breaker 86 engages female electrical contacts (not shown) in circuit breaker panel 80 with the male electrical contacts of the main circuit breaker 86. Taking each wire 89 feeding each respective circuit in the building, the end is stripped and the ends of the wires inserted into color coded gripper holes located in the end of wire modules 88b. These male dovetail wire modules 88b are then inserted into female dovetail receptacles 87b, engaging male electrical contacts 88b with female electrical contacts in the back of female dovetail receptacles 87b. After this has been accomplished for all circuits, a copper grounding wire is secured to the circuit breaker panel 80 by means of a set screw and the panel cover (not shown) is placed over the entire panel leaving only the circuit breaker switches and surge supressor light 100 exposed, and this being secured to the panel by means of four screws one at each corner.

In the event that a 220 volt circuit is required, the divider between the two wire module circuit feed receptacles to be used, is broken out and a special larger wire module 88c is used with male electrical contacts engaging female electrical contacts in both female module receptacles and thus drawing electrical power from both phase buss bars. Again, the wire gripper holes in the larger 220 volt wire module are color coded for ease of installation.

Should additional circuits be required at a later date and insufficient space remains in the existing circuit breaker panel 80, male dovetail 91 located at the top of circuit breaker panel extension module 90 is inserted into female dovetail 83 located at the bottom of circuit breaker panel 80, engaging male electrical contacts at the back of male dovetail 91 with female electrical contacts in female dovetail 83. This provides an immediate extension of the two buss bars and additional circuit breaker positions, the number dependant on the size of the extension module added. This extension module 90 is wired in the same way as described above for connecting circuit wires 89 to the panel 80. The covers (not shown) for both panel 80 and panel 90 are then secured to the front of panel 80 and panel 90 with eight screws, one at each corner.

Referring now to FIG. 11, there is shown electric circuit 102 formed of the hardware described herein. Service feed cable 81a powers circuit breaker panel 80. Each circuit is powered through a standard plug in circuit breaker 96 and circuit breaker module 97 and then through wire module 88b and out of the panel through wire 89 to electrical box 104. This single source of electrical power then provides electrical power to box 106 and box 108 through the dovetail and electrical contacts as previously described. Dual receptacle module 70 is inserted into electrical box 104. A single throw single pole switch module 50 is inserted into electrical box 106 with an output wire feeding an electrical box into which a lighting module has been placed. A junction box module has been inserted in electrical box 108 which simply connects the power from the input side to the output side of the box, thus powering electrical box 110 and electrical box 112 into which dual receptacle modules have been inserted.

In view of the above, it can be seen that residential and commercial buildings can be wired and modified quickly, easily, and safely using the module hardware of the present invention and that such modular hardware is usable even by those having limited experience with electrical wiring systems.

Even though specific embodiments of a modular electrical wiring system have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A modular electrical wiring system comprising:
   first and second electrical boxes;
   means for mounting the first box on a wall and supplying electrical energy to the first box;

the first and second boxes each including means for receiving and applying electrical energy to respective first and second function units;

connecting means disposed on exterior surfaces of the first and second boxes for supportedly connecting the first box to the second box; and, the connecting means further including means for applying electrical energy from the first box to the second box wherein only energy from the first box is applied to the second function unit.

2. The modular electrical wiring system of claim 1 further comprising a first function unit disposed in the receiving means of said first box and a second function unit disposed in the receiving means of said second box, and said function units each include means for conductively receiving a standard function module.

3. The modular electrical wiring system of claim 2 wherein the means for receiving and applying electrical energy to the function unit comprises a centrally disposed opening defining a cavity which includes female electrical contacts which conductively mate with male electrical contacts mounted on the function unit.

4. The modular electrical wiring system of claim 3 wherein the function units include wire pins electrically coupled to the male electrical contacts.

5. The modular electrical wiring system of claim 4, further comprising a first standard function module disposed in said first function unit and a second standard function module disposed in said second function unit, wherein the wire pins of each function unit are electrically coupled to its respective standard function module.

6. The modular electrical wiring system of claim 5 wherein each function unit and its respective standard function module is an integral electrical module.

7. The modular electrical wiring system of claim 6 wherein said first electrical box includes locking means for securing the integral electrical module in the receiving means.

8. The modular electrical wiring system of claim 5 wherein at least one standard function module is a standard single pole double throw switch.

9. The modular electrical wiring system of claim 5 wherein at least one standard function module is a dual outlet.

10. The modular electrical wiring system of claim 5 wherein at least one standard function module is a circuit breaker.

11. The modular electrical wiring system of claim 1 wherein the second electrical box includes further connecting means for supportedly and electrically connecting the second electrical box to a third electrical box, the further connecting means including means for applying electrical energy from the second box to the third box.

12. The modular electrical wiring system of claim 1 wherein the connecting means includes a male dovetail and a female dovetail, each dovetail including electrical contacts for electrically coupling the first electrical box to the second electrical box.

13. The modular electrical wiring system of claim 1 further comprising the first box having on its exterior surface a second connecting means, and a mounting bracket having on its exterior surface a mating connecting means, wherein the first box may be supportedly connected to the mounting bracket by connection of its said second connecting means to the connecting means of the bracket.

14. The modular electrical wiring system of claim 1 wherein each electrical box includes locking means for securing a pre-wired modular function unit in the receiving means.

15. A modular electrical wiring system comprising:
first, second and third electrical boxes;
first connecting means disposed on an exterior wall of the first electrical box for supportedly and electrically connecting the first electrical box to the second electrical box; and
second connecting means disposed on an exterior wall of the first electrical box for supportedly and electrically connecting the first electrical box to the third electrical box.

16. The modular electrical wiring system of claim 15 wherein the first connecting means is a male dovetail including electrical contacts for electrically connecting the first electrical box to the second electrical box and the second connecting means is a female dovetail including electrical contacts for electrically connecting the second electrical box to the third electrical box.

17. The modular electrical wiring system of claim 15 wherein the first electrical box includes power input means for receiving power from a power cable and power distribution means for distributing the input power to the first and second connecting means.

* * * * *